(12) United States Patent
Wu et al.

(10) Patent No.: US 11,558,361 B2
(45) Date of Patent: Jan. 17, 2023

(54) COMMUNICATION METHOD BETWEEN MESH NETWORK AND CLOUD SERVER, MESH NETWORK SYSTEM AND NODE DEVICE THEREOF

(71) Applicant: REALTEK SEMICONDUCTOR CORP., Hsinchu (TW)

(72) Inventors: Jing-Jun Wu, Hsinchu (TW); Cui Ding, Hsinchu (TW); Zuo-Hui Peng, Hsinchu (TW); Zhao-Ming Li, Hsinchu (TW); Guo-Feng Zhang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 361 days.

(21) Appl. No.: 16/944,669

(22) Filed: Jul. 31, 2020

(65) Prior Publication Data
US 2021/0306308 A1 Sep. 30, 2021

(30) Foreign Application Priority Data
Mar. 27, 2020 (CN) .................. 2020102284890.3

(51) Int. Cl.
*H04L 29/06* (2006.01)
*H04L 9/40* (2022.01)
(Continued)

(52) U.S. Cl.
CPC .......... *H04L 63/061* (2013.01); *H04L 9/0838* (2013.01); *H04L 9/14* (2013.01)

(58) Field of Classification Search
CPC ....... H04L 63/061; H04L 9/0838; H04L 9/14; H04L 63/0435; H04L 63/0442;
(Continued)

(56) References Cited

U.S. PATENT DOCUMENTS 9,129,125 B2 * 9/2015 Wang .................. G06F 21/6209
9,703,979 B1 * 7/2017 Yang ..................... H04L 9/3231
(Continued)

FOREIGN PATENT DOCUMENTS

CN 107231627 A 10/2017
CN 107889119 A 4/2018
(Continued)

*Primary Examiner* — Sanchit K Sarker
(74) *Attorney, Agent, or Firm* — Birch, Stewart, Kolasch & Birch, LLP

(57) ABSTRACT

A mesh network system suitable for connection to a cloud server is provided. The system includes: a first node device, configured to store a first private key and encrypt to-be-verified data according to the first private key to generate first encrypted data; and a second node device, configured to receive the first encrypted data and send the first encrypted data to the cloud server. After sending the first encrypted data, the second node device obtains, from the cloud server, second encrypted data generated by encrypting a first key according to the first public key. The second node device sends the second encrypted data to the first node device. The first node device decrypts the second encrypted data according to the first private key to obtain the first key from the second encrypted data, and performs encrypted communication with the cloud server according to the first key.

18 Claims, 4 Drawing Sheets

(51) Int. Cl.
*H04L 9/08* (2006.01)
*H04L 9/14* (2006.01)

(58) Field of Classification Search
CPC ............. H04L 2463/062; H04L 63/062; H04L 9/0894; H04L 63/06; H04L 67/10
See application file for complete search history.

(56) References Cited

U.S. PATENT DOCUMENTS

| | | | |
|---|---|---|---|
| 11,386,429 B2* | 7/2022 | Fan | H04L 9/0825 |
| 2003/0014372 A1 | 1/2003 | Wheeler et al. | |
| 2003/0187805 A1* | 10/2003 | Shen | H04L 63/045 |
| | | | 705/80 |
| 2012/0254616 A1 | 10/2012 | Brown | |
| 2013/0225081 A1* | 8/2013 | Doss | G06K 7/10 |
| | | | 455/41.2 |
| 2019/0158283 A1 | 5/2019 | Kang et al. | |
| 2020/0028673 A1* | 1/2020 | Howe | H04L 9/0838 |
| 2020/0036702 A1 | 1/2020 | Tempel et al. | |
| 2021/0319083 A1* | 10/2021 | Bernardi | H04L 9/3247 |
| 2021/0374269 A1* | 12/2021 | Alameh | G06F 21/6227 |
| 2022/0188467 A1* | 6/2022 | Lee | H04L 63/00 |

FOREIGN PATENT DOCUMENTS

| | | |
|---|---|---|
| CN | 108156644 A | 6/2018 |
| CN | 108199905 A | 6/2018 |
| CN | 108366362 A | 8/2018 |
| CN | 108391238 A | 8/2018 |

\* cited by examiner

COMMUNICATION METHOD BETWEEN MESH NETWORK AND CLOUD SERVER, MESH NETWORK SYSTEM AND NODE DEVICE THEREOF

CROSS-REFERENCE TO RELATED APPLICATION

This non-provisional application claims priority under 35 U.S.C. § 119(a) to Patent Application No. 202010228489.3 filed in China, P.R.C. on Mar. 27, 2020, the entire contents of which are hereby incorporated by reference.

BACKGROUND

Technical Field

The present disclosure relates to a communication method between a mesh network and a cloud server, and a mesh network system and a node device thereof.

Related Art

In a traditional mesh network system, each node device generates an encryption key through handshake during networking. During data transmission, each involved node device first performs decryption according to a key sent by a previous node device, and then performs encryption according to a key stored in the current node device before the node device sends data to a next node device. Each time the data passes through a node device, the foregoing steps need to be repeated once, resulting in a large amount of resource and time consumption during the data transmission.

Furthermore, since the node device, when sending the data to the next node device, also sends the key to the next node device for the next node device to decrypt the data by using a key between the node device and the next node device, then to encrypt the data by using the key, the key is likely to be stolen during the data transmission, resulting in a serious data security problem.

SUMMARY

In some embodiments, a mesh network system suitable for connection to a cloud server includes a first node device and a second node device. The first node device is configured to store a first private key and encrypt to-be-verified data according to the first private key to generate first encrypted data. The second node device receives the first encrypted data and forwards the first encrypted data to the cloud server. After sending the first encrypted data, the second node device obtains, from the cloud server, second encrypted data generated by encrypting a first key according to a first public key, the first public key corresponding to the first private key, the second node device forwards the second encrypted data to the first node device, the first node device decrypts the second encrypted data according to the first private key to obtain the first key from the second encrypted data, and performs encrypted communication with the cloud server according to the first key.

In summary, the private key is stored in the node device and the public key corresponding to the private key is stored in the cloud server for performing a key negotiation process, so that the public key may be free from being transmitted between the node device and the cloud server to prevent the public key from being stolen during the transmission, effectively protecting the public key and resolving a security problem during the transmission. In addition, during sending of the data by the node device to the cloud server, all node devices through which the data passes in a transmission path do not need to encrypt and decrypt the data to send the data to a next node device, reducing a large amount of resource consumption and a data transmission time between the node device and the cloud server.

DETAILED DESCRIPTION

Figure 1:
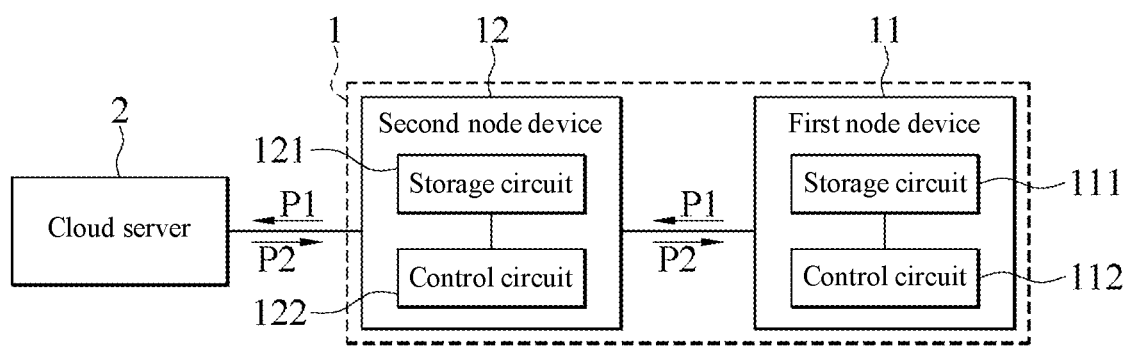
FIG. 1 is a schematic diagram of a data flow direction of an embodiment of a mesh network system according to the present disclosure.
Figure 2:
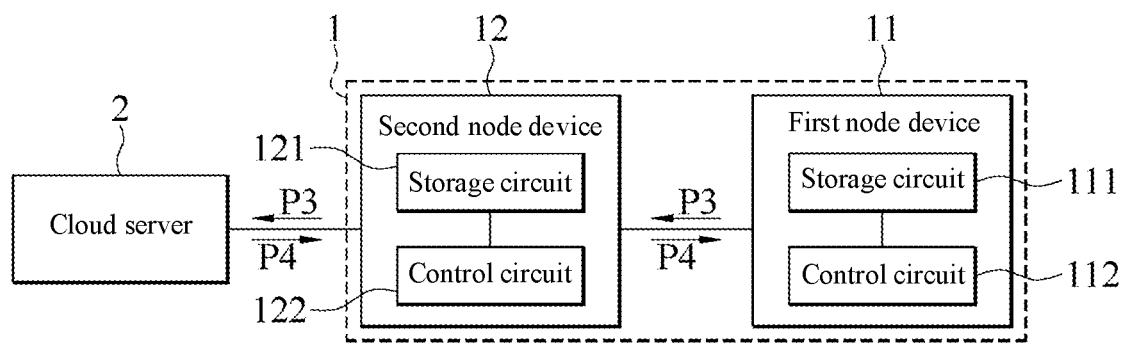
FIG. 2 is a schematic diagram of a data flow direction of an embodiment of a mesh network system according to the present disclosure.

Referring to both FIG. 1 and FIG. 2, FIG. 1 and FIG. 2 are respectively a schematic diagram of a data flow direction of an embodiment of a mesh network system 1 according to the present disclosure. The mesh network system 1 includes a plurality of node devices 11 and 12 (which are respectively referred to as a first node device 11 and a second node device 12 below for ease of description). The mesh network system 1 may be connected to a cloud server 2 to communicate with the cloud server 2. The first node device 11 is coupled to the second node device 12, and the second node device 12 is coupled to the cloud server 2. In other words, the second node device 12 is coupled between the first node device 11 and the cloud server 2. The first node device 11 and the second node device 12 may transmit data to the cloud server 2 and receive data from the cloud server 2, respectively.

The mesh network system 1 provides a network encryption/decryption service. Before transmission of communication data between the mesh network system 1 and the cloud server 2, the node devices 11 and 12 of the mesh network system 1 and the cloud server 2 perform a key negotiation process according to a corresponding public key and a corresponding private key to generate a key, and the mesh network system 1 then performs subsequent transmission of encrypted communication data between the node devices 11 and 12 and the cloud server 2 according to the generated key. In other words, after the node devices 11 and 12 of the mesh network system 1 and the cloud server 2 perform the key negotiation process, during each transmission of communication data between the node devices 11 and 12 and the cloud server 2, a key generated according to the key negotiation process is used to encrypt the communication data before sending of the communication data.

Figure 3:
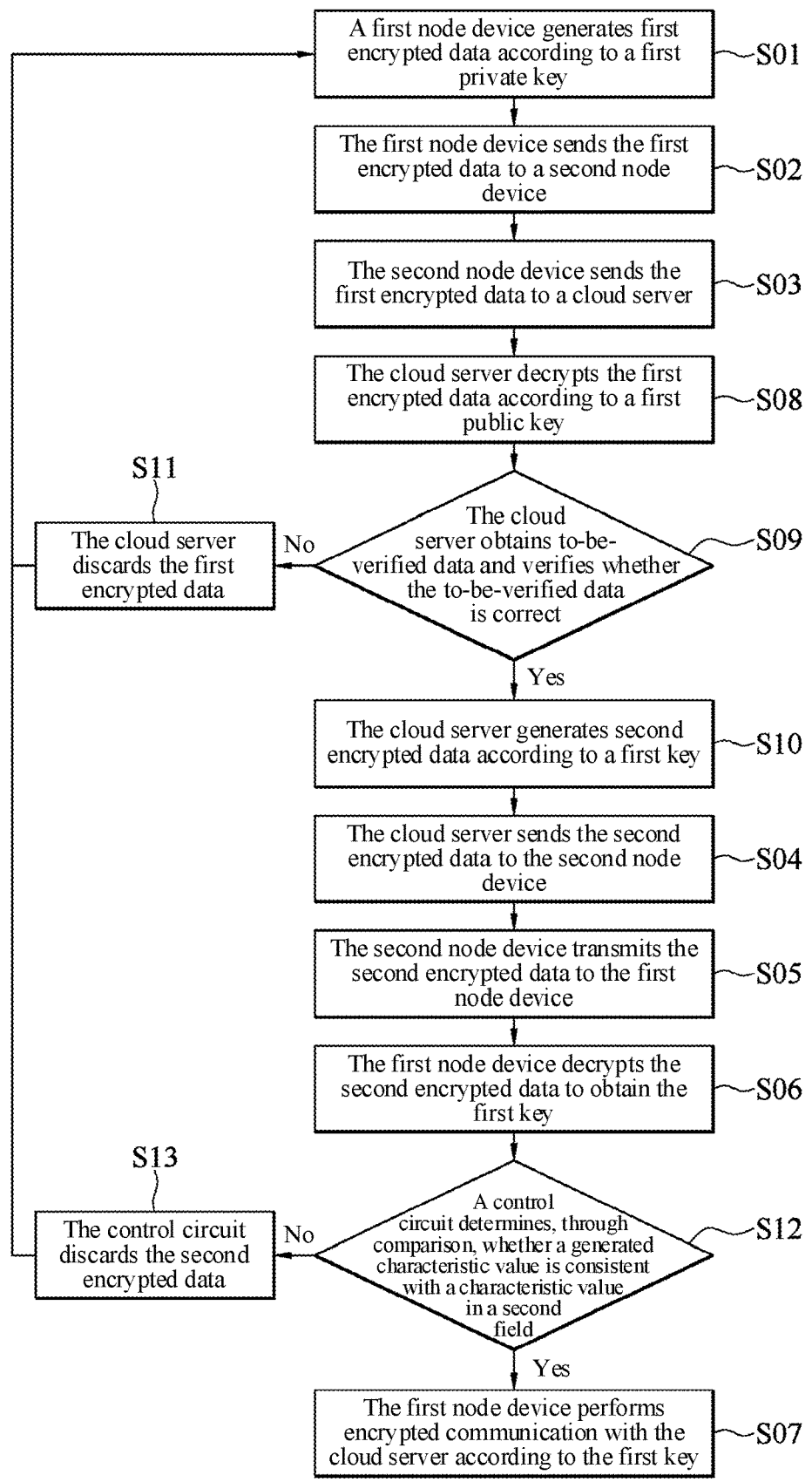
FIG. 3 is a flowchart of an embodiment of a communication method between a mesh network system and a cloud server according to the present disclosure.

Specifically, referring to all of FIG. 1 to FIG. 3, FIG. 3 is a flowchart of an embodiment of a communication method between a mesh network system 1 and a cloud server 2 according to the present disclosure. The first node device 11 includes a storage circuit 111 and a control circuit 112. The storage circuit 111 is coupled to the control circuit 112. The second node device 12 includes a storage circuit 121 and a control circuit 112. The storage circuit 121 is coupled to the control circuit 122. For example, the first node device 11 and the cloud server 2 perform a key negotiation process. The storage circuit 111 of the first node device 11 stores a private key (which is referred to as a first private key below) and the cloud server 2 stores a public key (which is referred to as a first public key below). The first private key and the first public key corresponding to each other are an encryption/decryption key pair, that is, an asymmetric encryption/decryption key pair. The control circuit 112 of the first node device 11 may generate a set of to-be-verified data by random numbers, and encrypt the to-be-verified data according to the first private key stored in the storage circuit 111 to generate encrypted data (which is referred to as first encrypted data P1) (step S01). The control circuit 112 sends the first encrypted data P1 to the second node device 12 in an uplink (step S02). After receiving the first encrypted data P1, the control circuit 122 of the second node device 12 does not perform an encryption/decryption process on the first encrypted data P1 but forwards the first encrypted data P1 to the cloud server 2 (step S03).

After forwarding the first encrypted data P1 to the cloud server 2, the control circuit 122 receives, in a downlink, another piece of encrypted data (which is referred to as second encrypted P2 data below) generated by the cloud server 2 by encrypting a key (which is referred to as a first key below) according to the first public key (step S04). After receiving the second encrypted data P2, the control circuit 122 does not perform an encryption/decryption process on the second encrypted data P2 but forwards the second encrypted data P2 to the first node device 11 (step S05). The control circuit 112 of the first node device 11 decrypts the second encrypted data P2 by using the above first private key. Since the first private key and the first public key corresponding to each other are an encryption/decryption key pair, the control circuit 112 can correctly decrypt, by using the first private key, the second encrypted data P2 encrypted according to the first public key, to obtain the first key from the decrypted second encrypted data P2 (step S06), thereby completing the above key negotiation process. The control circuit 112 may store the first key in the storage circuit 111. Subsequently, when the first node device 11 is to send communication data to the cloud server 2, the control circuit 112 performs encrypted communication with the cloud server 2 according to the first key (step S07). In other words, the control circuit 112 may encrypt the communication data by using the first key and send the communication data to the cloud server 2 through the second node device 12.

Based on this, storing the first private key in the storage circuit 111 of the first node device 11 and the corresponding first public key in the cloud server 2 can free the first public key from being transmitted between the first node device 11 and the cloud server 2, effectively preventing the first public key from being stolen during the transmission and communication data from being stolen in that other node devices decrypt the communication data by using the stolen first public key. In addition, after receiving the first encrypted data P1, the control circuit 122 of the second node device 12 may send the first encrypted data P1 to the cloud server 2 in the uplink without encrypting and decrypting the first encrypted data P1, and may send the second encrypted data P2 to the control circuit 112 of the first node device 11 in the downlink without encrypting and decrypting the second encrypted data P2, reducing a communication time between the first node device 11 and the cloud server 2.

In some embodiments, in step S01, the control circuit 112 generates a packet including the first encrypted data P1, and the packet further includes a Media Access Control (MAC) address or a MESH identifier (ID) of the first node device 11. The first node device 11 sends the packet to the second node device 12 in step S02. For example, the packet includes the MAC address of the first node device 11. The second node device 12 forwards the first encrypted data P1 and the MAC address of the first node device 11 to the cloud server 2 in step S03. After step S03 is performed, the cloud server 2 queries, according to MAC address information of the first node device 11, the first public key corresponding to the first private key of the first node device 11. After finding the corresponding first public key, the cloud server 2 decrypts the first encrypted data P1 by using the first public key (step S08), and obtains the to-be-verified data from the decrypted first encrypted data P1. After obtaining the to-be-verified data, the cloud server 2 performs a verification process on the to-be-verified data to determine whether the to-be-verified data is complete and correct (step S09). After determining that the to-be-verified data is correct through the verification process (a determining result is "yes"), the cloud server 2 may generate the above first key by a random number. The cloud server 2 encrypts the first key by using the first public key used for decrypting the first encrypted data P1, to generate second encrypted data P2 (step S10), and sends the second encrypted data P2 to the second node device 12 (step S04), so as to complete the above key negotiation process.

In some embodiments, after the first node device 11 completes the key negotiation process, in step S07, referring to FIG. 2, the control circuit 112 encrypts communication data (which is referred to as first communication data below) according to the first key stored in the storage circuit 111, to generate third encrypted data P3, and sends the third encrypted data P3 to the second node device 12. The second node device 12 forwards the third encrypted data P3 to the cloud server 2. The cloud server 2 decrypts the third encrypted data P3 according to the first key to obtain the first communication data, so as to complete an encrypted communication data transmission process between the first node device 11 and the cloud server 2. In addition, when the cloud server 2 is to send another piece of communication data (which is referred to as second communication data below) to the first node device 11, the cloud server 2 encrypts the second communication data according to the first key to generate fourth encrypted data P4. The cloud server 2 sends the fourth encrypted data P4 to the second node device 12, and the second node device 12 forwards the fourth encrypted data P4 to the first node device 11. The control circuit 112 decrypts the fourth encrypted data P4 by using the first key stored in the storage circuit 111 to obtain the second communication data, so as to complete the encrypted communication data transmission process between the cloud server 2 and the first node device 11.

In some embodiments, the first node device 11 stores the first private key in the storage circuit 111 before delivery, and the second node device 12 stores a private key (which is referred to as a second private key below) different from the first private key in the storage circuit 121 before delivery.

The cloud server 2 stores the first public key corresponding to the first private key of the first node device 11 and a public key (which is referred to as a second public key below) corresponding to the second private key of the second node device 12, respectively, so that the second node device 12 can also perform a key negotiation process with the cloud server 2. Based on this, during the key negotiation process performed by the second node device 12, in the uplink, the control circuit 122 of the second node device 12 encrypts another piece of to-be-verified data by using the second private key stored in the storage circuit 121 to generate encrypted data (which is referred to as fifth encrypted data below). In addition, the control circuit 122 generates a packet including the fifth encrypted data and MAC address information of the second node device 12, and sends the packet to the cloud server 2. The cloud server 2 selects, according to the MAC address information of the second node device 12, the second public key corresponding to the second private key, and decrypts the fifth encrypted data by using the second public key to obtain the another piece of to-be-verified data sent by the second node device 12. The cloud server 2 performs a verification process on the another piece of to-be-verified data to determine whether the another piece of to-be-verified data is complete and correct.

After determining, through the verification process that the another piece of to-be-verified data is correct, the cloud server 2 generates another set of keys (which are referred to as a second key below) different from the first key by a random number, and encrypts the second key by using the second public key to generate another piece of encrypted data (which is referred to as sixth encrypted data). The second key is used for encryption and decryption during subsequent communication between the second node device 12 and the cloud server 2. The cloud server 2 sends the sixth encrypted data to the second node device 12 in the downlink, and the control circuit 122 decrypts the sixth encrypted data by using the second private key to obtain the second key, and performs a verification process to verify the second key. After verification of the second key succeeds, the key negotiation process is completed, and the control circuit 122 may store the second key in the storage circuit 121. When the second node device 12 is to send communication data (which is referred to as third communication data below) to the cloud server 2, the control circuit 122 encrypts the third communication data by using the second key and sends the encrypted third communication data to the cloud server 2 in the uplink, so as to complete an encrypted communication data transmission process between the second node device 12 and the cloud server 2. In some embodiments, if the cloud server 2 is to send communication data (which is referred to as fourth communication data below) to the second node device 12, the cloud server 2 encrypts the fourth communication data by using the second key, and sends the encrypted fourth communication data to the second node device 12 in the downlink, so as to complete the encrypted communication data transmission process between the cloud server 2 and the second node device 12.

Figure 4:
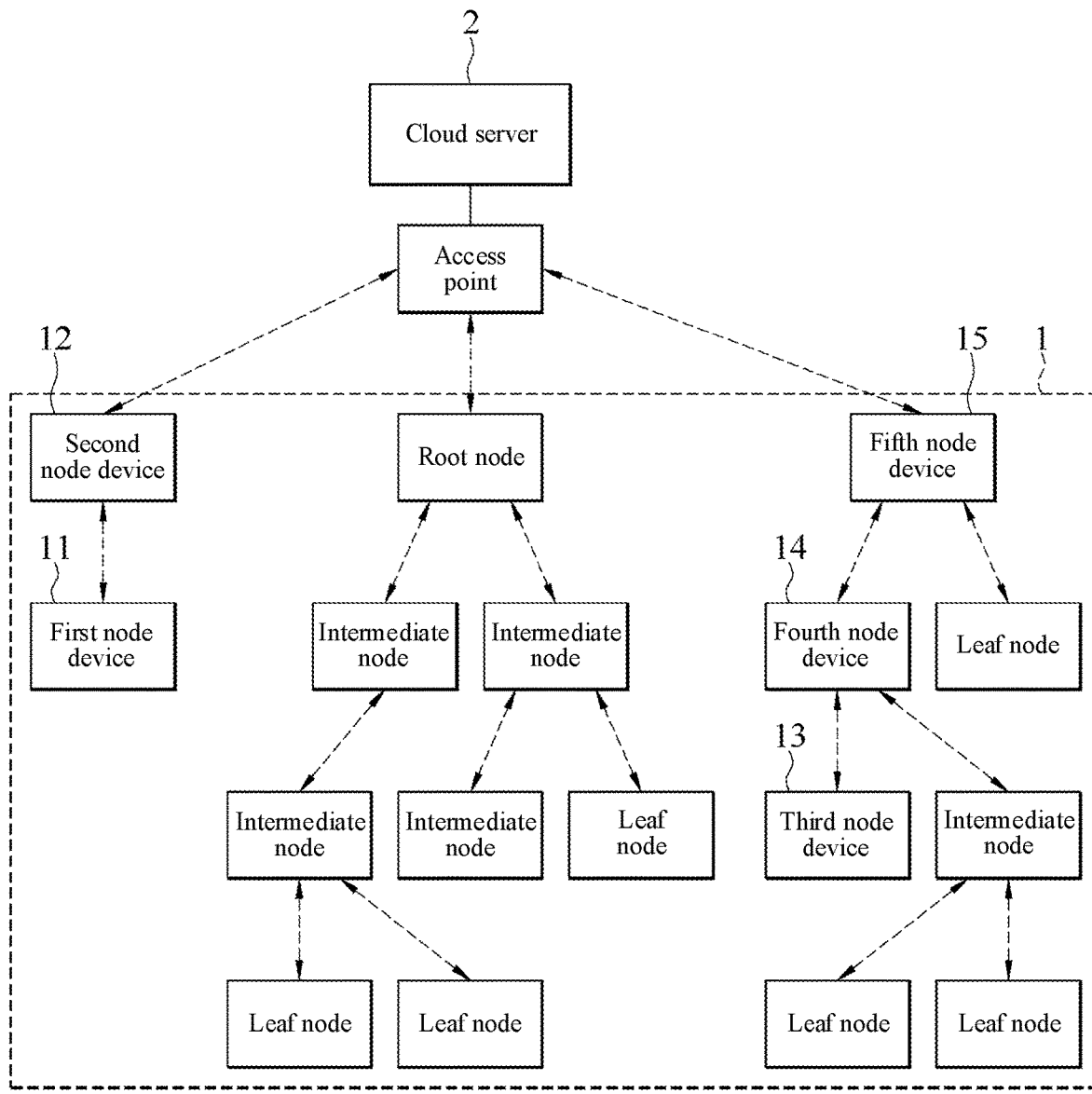
FIG. 4 is a schematic diagram of an embodiment of node device distribution of a mesh network system according to the present disclosure.

In some embodiments, referring to FIG. 4, FIG. 4 is a schematic diagram of an embodiment of node device distribution of a mesh network system 1 according to the present disclosure. The mesh network system 1 may be connected to an access point (AP) so as to be connected to the cloud server 2. The mesh network system 1 includes a plurality of node devices distributed in a tree shape. For example, the mesh network system 1 depicted in FIG. 4 has seventeen node devices and five (node devices 11-15) of the node devices are marked herein, but the present disclosure is not limited thereto. During networking of the plurality of node devices to form the mesh network system 1, when a received signal strength indication (RSSI) of one of the node devices is greater than a preset RSSI threshold of the AP, the node device is connected to the AP, and the node device is therefore a root node. In the uplink, the root node may gather transmission data of a node device as a leaf node and a node device as an intermediate node and transmit the transmission node to the cloud server 2 through the AP. In other words, the root node is an interface device node between the mesh network system 1 and an external Internet Protocol (IP) network. The root node has a child node but without a parent node. The intermediate node has a forwarding function. The intermediate node has a parent node but not necessarily a child node. When a node is idle, the node may be connected to the intermediate node to become a child node of the intermediate node. In other words, the intermediate node has a parent node and a child node. FIG. 4 illustrates an intermediate node with a child node and an intermediate node without a child node.

For example, as shown in FIG. 1 and FIG. 4, the first node device 11 is a leaf node, and the second node device 12 is a root node connected to the AP. For example, the first node device 11 and the cloud server 2 perform a key negotiation process. The control circuit 112 of the first node device 11 sends, in the uplink, first encrypted data P1 generated through encryption according to the first private key stored in the storage circuit 111 to the second node device 12, and the control circuit 122 of the second node device 12 sends the first encrypted data P1 to the cloud server 2. In the downlink, the first node device 11 is a destination node. The cloud server 2 sends the second encrypted data P2 and the MAC address information of the first node device 11 to the second node device 12. After receiving the second encrypted data P2, the control circuit 122 determines whether the second node device is the destination node. The control circuit 122 determines that the second node device 12 is not the destination node according to the MAC address information of the first node device 11. Therefore, the control circuit 122 forwards the second encrypted data P2 and the MAC address information of the first node device 11 to the first node device 11. After receiving the second encrypted data P2, the control circuit 112 also determines whether the first node device 11 is the destination node. Therefore, the control circuit 112 determines, according to the MAC address information of the first node device 11, that the first node device 11 is the destination node for receiving the second encrypted data P2. The control circuit 112 decrypts the second encrypted data P2 according to the first private key stored in the storage circuit 111 to obtain the first key. The first node device 11 stores the first key to the storage circuit 111 to perform encrypted communication with the cloud server 2 according to the first key.

As shown in FIG. 4, the mesh network system 1 may further include a third node device 13, a fourth node device 14, and a fifth node device 15. The third node device 13, the fourth node device 14, and the fifth node device 15 also include a storage circuit and a control circuit, respectively. The fifth node device 15 is coupled to the AP, and the fourth node device 14 is coupled between the third node device 13 and the fifth node device 15, that is, the fifth node device 15 is a root node, the fourth node device 14 and the third node device 13 are an intermediate node and a leaf node, respectively, the fifth node device 15 is a parent node of the fourth node device 14, and the third node device 13 is a child node of the fourth node device 14. A control circuit of the third node device 13 is configured to store a private key (which is referred to as a third private key below) different from the first private key and the second private key, and the cloud server 2 stores a public key (which is referred to as a third public key below) corresponding to the third private key. The third public key is different from the first public key and the second public key. During a key negotiation process between the third node device 13 and the cloud server 2, the control circuit of the third node device 13 generates, in the uplink, encrypted data (which is referred to as seventh encrypted data below) through encryption according to the third private key stored in a storage circuit of the third node device 13, and sends the seventh encrypted data to a parent node of the third node device, that is, the fourth node device 14. After the fourth node device 14 receives the seventh encrypted data from the third node device 13 as a child node of the fourth node device, since the fourth node device 14 is an intermediate node, a control circuit of the fourth node device 14 forwards the seventh encrypted data to the parent node of the fourth node device, that is, the fifth node device 15 in the uplink. After the fifth node device 15 receives the seventh encrypted data from the fourth node device 14 as a child node of the fifth node device, since the fifth node device 15 is the root node, a control circuit of the fifth node device 15 forwards the seventh encryption to cloud server 2 in the uplink.

In some embodiments, the mesh network system 1 may be suitable for an indoor home environment, and the node devices 11-15 may be any electronic device such as household appliances, an audio-visual entertainment device, a wearable and handheld device, etc.

In some embodiments, after the first node device 11 obtains the first key in step S06, the control circuit 112 may further send a confirmation message to the second node device 12 in step S06. The control circuit 122 of the second node device 12 then forwards the confirmation message to the cloud server 2 to complete the key negotiation process between the first node device 11 and the cloud server 2. The confirmation message may be a value of 0 or 1. When the confirmation message is 1, it indicates that the storage circuit 111 fails to store the first key. When the confirmation message is 0, it indicates that the control circuit 112 successfully decrypts the second encrypted data P2 by using the first private key and obtains the first key, and that the storage circuit 111 successfully stores the first key.

Figure 5:
FIG. 5 is a schematic diagram of an embodiment of a packet format of a packet including first encrypted data according to the present disclosure.

In some embodiments, the verification process performed by the cloud server 2 on the to-be-verified data and the verification process performed by the node devices 11 and 12 on the keys may be an MD5 message-digest algorithm. The MD5 message-digest algorithm is a cryptographic characteristic function that can generate a characteristic value corresponding to transmitted data for verification and comparison with the transmitted data. It may be determined according to a comparison result whether information content remains integrity during transmission. In particular, referring to FIG. 5, FIG. 5 is a schematic diagram of an embodiment of a packet format of a packet including first encrypted data P1 according to the present disclosure. As shown in FIG. 5, the decrypted first encrypted data P1 includes a first field and a second field. The first field of the first encrypted data P1 is used to store to-be-verified data P11, and the second field of the first encrypted data P1 is used to store a characteristic value P12 generated by executing the MD5 message-digest algorithm according to the to-be-verified data P11. In the uplink, after the cloud server 2 obtains the first encrypted data P1 and decrypts the first encrypted data P1 according to the first public key (step S08), in step S09, the cloud server 2 obtains the to-be-verified data P11 from the first field of the first encrypted data P1, executes the MD5 message-digest algorithm according to the to-be-verified data P11 to generate a characteristic value, and determines whether the generated characteristic value is consistent with the characteristic value P12 stored in the second field of the first encrypted data P1 (step S09). If a comparison result is that the two characteristic values are consistent (a determining result is "yes"), the cloud server 2 continues to perform step S10. If the comparison result is that the two characteristic values are inconsistent (the determining result is "no"), the cloud server 2 discards the first encrypted data P1 (step S11).

Figure 6:
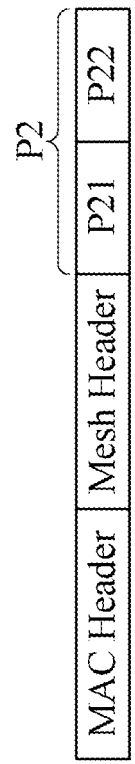
FIG. 6 is a schematic diagram of an embodiment of a packet format of a packet including second encrypted data according to the present disclosure.

In some embodiments, referring to FIG. 6, FIG. 6 is a schematic diagram of an embodiment of a packet format of a packet including second encrypted data P2 according to the present disclosure. The second encrypted data P2 decrypted by the control circuit 112 of the first node device 11 includes another first field and another second field. The first field of the second encrypted data P2 is used to store a first key P21, and the second field of the second encrypted data P2 is used to store a characteristic value P22 generated by executing the MD5 message-digest algorithm according to the first key P21. In the downlink, after decrypting the second encrypted data P2 (step S06), the control circuit 112 obtains the first key P21 from the first field of the second encrypted data P2 and executes the MD5 message-digest algorithm based on the first key P21 to generate another characteristic value in step S06. The control circuit 112 determines whether the generated another characteristic value is consistent with the characteristic value P22 stored in the second field of the second encrypted data P2 (step S12). If the two characteristic values are consistent, step S07 is performed subsequently. If the two characteristic values are inconsistent, the control circuit 112 discards the second encrypted data P2 (step S13).

Figure 7:
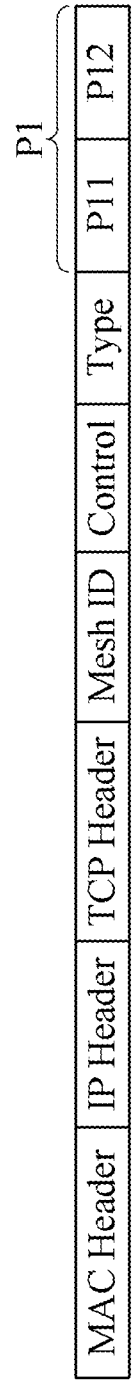
FIG. 7 is a schematic diagram of another embodiment of a packet format of a packet including first encrypted data according to the present disclosure.
Figure 8:
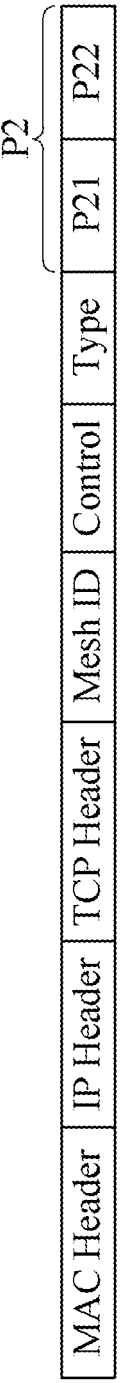
FIG. 8 is a schematic diagram of another embodiment of a packet format of a packet including second encrypted data according to the present disclosure.

In some embodiments, referring to FIG. 7 and FIG. 8, FIG. 7 and FIG. 8 are schematic diagrams of another embodiment of a packet format of a packet including first encrypted data P1 and second encrypted data P2 according to the present disclosure. During communication between the first node device 11 and the cloud server 2, in the uplink, the control circuit 112 of the first node device 11 transmits, to the second node device 12, the first encrypted data P1 with a packet format including the first field storing the to-be-verified data P11 and the second field storing the characteristic value P12 shown in FIG. 5. After receiving the first encrypted data P1, the control circuit 122 of the second node device 12 converts a packet including the first encrypted data P1 into a packet conforming to a preset format for communication with the cloud server 2 shown in FIG. 7. The packet conforming to the preset format may include a MESH identifier (ID) field and a control field. In addition, the first encrypted data P1 still retains the first field storing the to-be-verified data P11 and the second field storing the characteristic value P12 during the conversion. The control circuit 122 then sends, to the cloud server 2, the converted first encrypted data P1 conforming to the preset format for communication with the cloud server 2 shown in FIG. 7. Similarly, since the fifth node device 15 is the root node, the fifth node device 15 also sends, to the cloud server 2, a packet conforming to the preset format for communication with the cloud server 2. Details are not described herein again.

Furthermore, in the downlink, the control circuit 122 of the second node device 12 receives, from the cloud server 2, the second encrypted data P2 conforming to the preset format for communication with the cloud server 2 shown in FIG. 8. A packet conforming to the preset format may also include a MESH ID field and a control field, and include the first field storing the first key P21 and the second field storing the characteristic value P22. The control circuit 122 converts the packet including the second encrypted data P2 into a packet conforming to a preset format for communication with the first node device 11 shown in FIG. 6, and the second encrypted data P2 still retains the first field storing the first key P21 and the second field storing the characteristic value P22. The control circuit 122 then sends, to the first node device 11, the converted second encrypted data P2 conforming to the preset format for communication with the first node device 11.

In summary, the private key is stored in the node device and the public key corresponding to the private key is stored in the cloud server for performing a key negotiation process, so that the public key may be free from being transmitted between the node device and the cloud server to prevent the public key from being stolen during the transmission, effectively protecting the public key and resolving a security problem during the transmission. In addition, during sending of the data by the node device to the cloud server, all node devices through which the data passes in a transmission path do not need to encrypt and decrypt the data to send the data to a next node device, reducing a large amount of resource consumption and a data transmission time between the node device and the cloud server.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A mesh network system suitable for connection to a cloud server, comprising:
a first node device configured to store a first private key and encrypt to-be-verified data according to the first private key to generate first encrypted data; and
a second node device coupled to the first node device and connected to the cloud server, the second node device receiving the first encrypted data and forwarding the first encrypted data to the cloud server, wherein
after forwarding the first encrypted data, the second node device obtains, from the cloud server, second encrypted data generated by encrypting a first key according to a first public key, the first public key corresponding to the first private key, the second node device forwards the second encrypted data to the first node device, and the first node device decrypts the second encrypted data according to the first private key to obtain the first key from the second encrypted data, and performs encrypted communication with the cloud server according to the first key,
wherein when the first node device is not the destination node, the second node device forwards the second encrypted data to another node device in the mesh network system,
wherein the second node device is configured to store a second private key different from the first private key, the second node device encrypting another piece of to-be-verified data according to the second private key to generate fifth encrypted data, sending the fifth encrypted data to the cloud server, and obtaining, from the cloud server, sixth encrypted data generated by encrypting a second key according to a second public key after sending the fifth encrypted data, the second public key corresponding to the second private key, and the second node device decrypting the sixth encrypted data according to the second private key to obtain the second key from the sixth encrypted data, and performs encrypted communication with the cloud server according to the second key.

2. The mesh network system according to claim 1, wherein the cloud server is configured to store the first public key corresponding to the first private key, the cloud server obtaining the first encrypted data from the second node device, decrypting the first encrypted data according to the first public key to obtain the to-be-verified data and verify the to-be-verified data, generating the first key by a random number, encrypting the first key according to the first public key to generate the second encrypted data, and sending the second encrypted data to the second node device.

3. The mesh network system according to claim 1, wherein the second encrypted data decrypted by the first node device comprises a first field and a second field, the first field being used to store the first key, and the second field being used to store a characteristic value generated according to the first key, the first node device verifying the first key according to the characteristic value after decrypting the second encrypted data.

4. The mesh network system according to claim 2, wherein the first encrypted data decrypted by the cloud server comprises another first field and another second field, the another first field being used to store the to-be-verified data, and the another second field being used to store another characteristic value generated according to the to-be-verified data, the cloud server verifying the to-be-verified data according to the another characteristic value after decrypting the first encrypted data.

5. The mesh network system according to claim 1, wherein after obtaining the first key, the first node device sends third encrypted data generated by encrypting first communication data according to the first key, to receive fourth encrypted data generated by encrypting second communication data according to the first key from the second node device, so as to decrypt the fourth encrypted data according to the first key to obtain the second communication data.

6. The mesh network system according to claim 5, wherein after receiving the third encrypted data, the cloud server decrypts the third encrypted data according to the first key to obtain the first communication data, verifies the first communication data, encrypts the second communication data according to the first key after verification of the first communication data succeeds to generate the fourth encrypted data, and sends the fourth encrypted data.

7. The mesh network system according to claim 1, wherein after obtaining the first key from the second encrypted data, the first node device sends a confirmation message to the cloud server through the second node device.

8. The mesh network system according to claim 1, wherein after receiving the first encrypted data, the second node device generates a packet according to the first encrypted data, and sends the packet to the cloud server, a form of the packet conforming to a present format for communication with the cloud server.

9. A node device of a mesh network system, suitable for communication with a cloud server and comprising:
a storage to store a first private key; and a hardware controller circuit coupled to the storage to encrypt to-be-verified data according to the first private key in an uplink to generate first encrypted data and send the first encrypted data, and receive, in a downlink, second encrypted data generated by the cloud server according to a first public key corresponding to the first private key, the hardware controller circuit determining whether the node device is a destination node to receive the second encrypted data in the network system after receiving the second encrypted data, wherein when the node device is the destination node, the hardware controller circuit decrypts the second encrypted data according to the first private key to obtain a first key from the second encrypted data, and stores the first key in the storage to perform encrypted communication with the cloud server according to the first key, or when the node device is not the destination node, the hardware controller circuit forwards the second encrypted data to other node devices in the mesh network system, wherein after obtaining the first key, the hardware controller circuit encrypts first communication data according to the first key to generate third encrypted data, and forwards the third encrypted data to the cloud server through other node devices in another uplink, the other node devices forward, in another downlink, fourth encrypted data generated by the cloud server by encrypting second communication data according to the first key, and the hardware controller circuit receives the fourth encrypted data and decrypts the fourth encrypted data according to the first key to obtain the second communication data.

10. The node device according to claim 9, wherein when the node device is a root node in the mesh network system and the hardware controller circuit receives other encrypted data from a child node in the uplink, the hardware controller circuit forwards the other encrypted data to the cloud server.

11. The node device according to claim 10, wherein when the node device is an intermediate node in the mesh network system and the hardware controller circuit receives the other encrypted data from the child node in the uplink, the hardware controller circuit forwards, in the uplink, the other encrypted data to a parent node in the mesh network system.

12. The node device according to claim 10, wherein when the node device is the root node in the mesh network system, the hardware controller circuit sends a packet comprising the first encrypted data to the cloud server, a format of the packet conforming to a preset format for communication with the cloud server, and the hardware controller circuit sending the packet to the cloud server.

13. The node device according to claim 9, wherein the hardware controller circuit decrypts the second encrypted data after receiving the second encrypted data, obtains the first key from a first field of the second encrypted data and a characteristic value from a second field of the second encrypted data after decrypting the second encrypted data, and verifies the first key according to the characteristic value.

14. The node device according to claim 9, wherein after obtaining the first key from the second encrypted data in the downlink, the hardware controller circuit sends a confirmation message to the cloud server.

15. A communication method between a mesh network and a cloud server, comprising:
  encrypting, by a first node device, to-be-verified data according to a first private key to generate first encrypted data;
  sending, by the first node device, the first encrypted data to a second node device;
  forwarding, by the second node device, the first encrypted data to the cloud server;
  after sending the first encrypted data, obtaining, by the second node device from the cloud server, second encrypted data generated by encrypting a first key according to a first public key, the first public key corresponding to the first private key;
  forwarding, by the second node device, the second encrypted data to the first node device;
  decrypting, by the first node device, the second encrypted data according to the first private key to obtain the first key from the second encrypted data;
  performing, by the first node device, encrypted communication with the cloud server according to the first key; and
  when the first node device is not the destination node, forwarding, by the second node device, the second encrypted data to another node device in the mesh network,
  wherein the second node device is configured to store a second private key different from the first private key, the second node device encrypting another piece of to-be-verified data according to the second private key to generate fifth encrypted data, sending the fifth encrypted data to the cloud server, and obtaining, from the cloud server, sixth encrypted data generated by encrypting a second key according to a second public key after sending the fifth encrypted data, the second public key corresponding to the second private key, and the second node device decrypting the sixth encrypted data according to the second private key to obtain the second key from the sixth encrypted data, and performs encrypted communication with the cloud server according to the second key.

16. The communication method according to claim 15, further comprising:
  after obtaining the first encrypted data from the second node device, decrypting, by the cloud server, the first encrypted data according to the first public key to obtain the to-be-verified data;
  after obtaining the to-be-verified data, verifying, by the cloud server, the to-be-verified data;
  when verification of the to-be-verified data succeeds, generating, by the cloud server, the first key by a random number;
  encrypting, by the cloud server, the first key according to the first public key to generate the second encrypted data; and
  sending, by the cloud server, the second encrypted data to the second node device.

17. The communication method according to claim 16, wherein the step of verifying, by the cloud server, the to-be-verified data comprises:
  obtaining, by the cloud server, the to-be-verified data from a first field of the first encrypted data;
  obtaining, by the cloud server, another characteristic value from a second field of the first encrypted data; and
  verifying, by the cloud server, the to-be-verified data according to the another characteristic value to determine whether to discard the first encrypted data.

18. The communication method according to claim 15, further comprising:

after decrypting the second encrypted data, obtaining, by the first node device, the first key from a first field of the second encrypted data;
obtaining, by the first node device, a characteristic value from a second field of the second encrypted data; and
verifying, by the first node device, the first key according to the characteristic value to determine whether to discard the first key.

* * * * *